United States Patent Office 3,293,271
Patented Dec. 20, 1966

3,293,271
6-FLUOROESTRA OR ANDROSTAPENTAENES, INTERMEDIATES AND METHODS OF PREPARING THE SAME
Milton Heller, New City, N.Y., Robert Herman Lenhard, Ridgefield Park, N.J., and Seymour Bernstein, New City, N.Y., assignors to American Cyanamid Company, Stamford, Conn., a corporation of Maine
No Drawing. Filed Feb. 12, 1965, Ser. No. 432,391
10 Claims. (Cl. 260—397.3)

This invention relates to new steroid compounds. More particularly, it relates to 6-fluoroequilenin $C_3$ and/or $C_{17}$ derivatives and intermediates thereof.

The novel compounds of the present invention may be illustrated by the following formula:

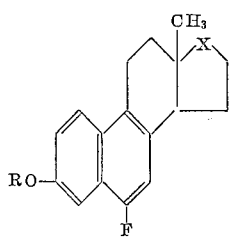

wherein R is selected from the group consisting of hydrogen and lower alkanol and X is selected from the group consisting of

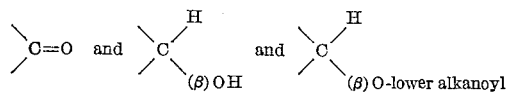

The compounds of this invention are, in general, white crystalline solids, relatively insoluble in water, but generally soluble in organic solvents such as lower alkanols, acetone, ethyl acetate and the like.

The 6-fluoroequileninsteroids described above may be prepared by a series of reactions starting with 6α-fluoro-11β-hydroxyandrosta-1,4-diene-3,17-dione (described in United States Patent No. 2,867,630 issued January 6, 1959) as outlined hereinafter in the accompanying flowsheet and as described in detail in the examples which follow.

FLOWSHEET

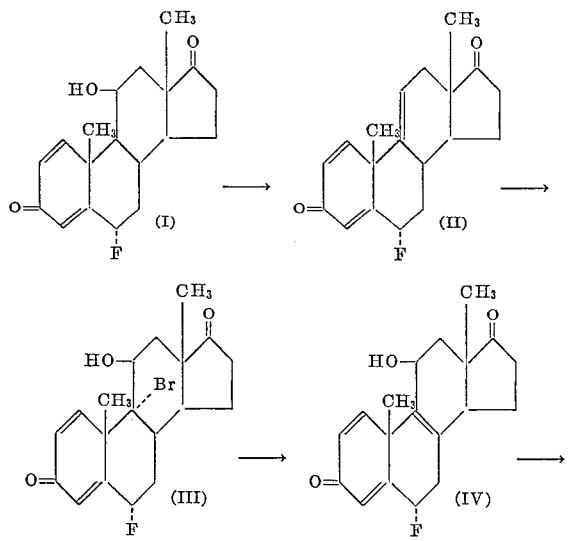

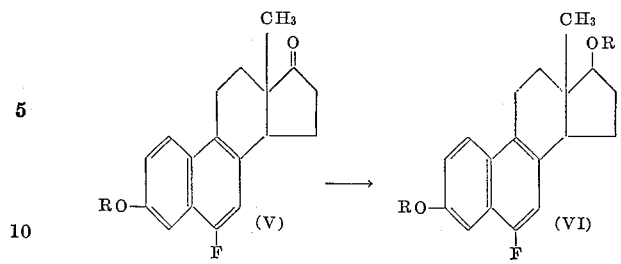

wherein Va, R=H; Vb, R=Ac; R is hydrogen or lower alkanoyl; VIa, R=H; VIb, R=Ac.

The compounds of the present invention are biologically active and show activity as estrogenic agents. They are therefore potentially useful as such or in combination with progesterone in sex hormone therapy.

The preparation of 6-fluoroequilenin and its derivatives are described in detail in the following examples.

*Example 1.—Preparation of 6α-fluoroandrosta-1,4,9(11)-triene-3,17-dione (II)*

A stirred solution of 200 mg. of 6α-fluoro-11β-hydroxyandrosta-1,4-diene-3,17-dione (I) (described in United States Patent No. 2,867,630) in 2 ml. of dry dimethylformamide and 0.66 ml. of s-collidine is cooled to approximately 5° C. and a solution of 0.10 ml. of methanesulfonyl chloride saturated with sulfur dioxide is slowly added. After stirring at room temperature for 5 minutes, the reaction mixture is cooled in an ice bath and the product is precipitated by slow addition of water. The washed and dried product is dissolved in methylene chloride and filtered through a small pad of magnesium silicate. The filtrate is evaporated and the residual solid is crystallized from acetone-hexane to give pure 6α-fluoroandrosta-1,4,9(11)-triene-3,17-dione, melting point 201°–204° C.

The product of this example is active as a protein anabolic agent.

*Example 2.—Preparation of 9α-bromo-6α-fluoro-11β-hydroxyandrosta-1,4-diene-3,17-dione (III)*

A stirred solution of 500 mg. of 6α-fluoro-androsta-1,4,9(11)-triene-3,17-dione (II) in 10 ml. of methylene chloride and 20 ml. of tertiary-butanol is treated at room temperature with a solution of 285 mg. of N-bromoacetamide in 5 ml. of tertiary-butanol and 1.55 ml. of 72% perchloric acid in 12 ml. of water. After stirring for 15 minutes, a solution of 285 mg. of sodium sulfite in 15 ml. of water is added and the reaction mixture is concentrated under reduced pressure (bath temperature under 45° C.) until crystals appear. Water is added and the product is filtered and washed with water. Crystallization from acetone-hexane affords pure 9α-bromo-6α-fluoro-11β-hydroxyandrosta-1,4,-diene-3,17-dione, melting point 197.5°–198.5° C. dec.

*Example 3.—Preparation of 6α-fluoro-11β-hydroxyandrosta-1,4,8-triene-3,17-dione (IV)*

A solution of 2.53 g. of 9α-bromo-6α-fluoro-11β-hydroxyandrosta-1,4-diene-3,17-dione (III) in 10 ml. of s-collidine is heated under reflux for 10 minutes. The reaction mixture is cooled to room temperature and the precipitated collidine hydrobromide is filtered and washed with ether. The filtrate (total volume of approximately 150 ml.) is cooled and the precipitated product is filtered and washed with ether. The crude product is triturated with water to remove any residual trace of collidine hydrobromide, filtered and washed with water. Crystallization from acetone-hexane gives pure 6α-fluoro-11β-hydroxyandrosta-1,4,8-triene-3,17-dione, melting point 237° C. dec.

*Example 4.—Preparation of 6-fluoro-3-hydroxyestra-1,3,5(10),6,8-pentaen-17-one (6-fluoroequilenin) (Va) and 6α-fluoroandrosta-1,4,8-(14),9(11)-tetraene-3,17-dione*

A suspension of 4.38 g. of 6α-fluoro-11β-hydroxyandrosta-1,4,8-triene-3,17-dione in 90 ml. of acetone and 2.25 ml. of concentrated hydrochloric acid is heated under reflux for 3 hours (complete solution is attained during the reaction). The reaction mixture is cooled to room temperature and poured into ice water to afford a viscous semi-solid. After being worked with a glass rod to a filterable solid, the crude mixture is filtered, washed with water and air dried. The solid, so obtained, is triturated with approximately 25 ml. of hot methylene chloride and after cooling, the insoluble fraction is filtered and washed with cold methylene chloride to afford essentially pure 6-fluoroequilenin, melting point 235°–240° C. Recrystallization from acetone-hexane gives pure 6-fluoroequilenin, melting point 242°–246° C.

The methylene chloride filterate is evaporated to a brown gum which is dissolved in 5 ml. of pyridine and 2.5 ml. of acetic anhydride and allowed to stand at room temperature overnight. After the addition of methanol and benzene the reaction mixture is evaporated under reduced pressure to a viscous red-brown oil which is dissolved in approximately 100 ml. of benzene and adsorbed on a 100 g. silica gel column. The column is eluted with 17–100 ml. fractions of 10% ethyl acetate-benzene. The first twelve fractions contain primarily a mixture of 6-fluoroequilenin acetate and 6α-fluoroandrosta-1,4,8(14),9(11)-tetraene-3,17-dione as indicated by thin layer chromatography, infra-red, and ultraviolet absorption data. The last five fractions are combined and evaporated. Crystallization of the residue from acetone-hexane gives 6α-fluoroandrosta-1,4,8(14),9(11)-tetraene-3,17-dione, melting point 193.5°–196° C. with decomposition at 202° C.

*Example 5.—Preparation of 3-acetoxy-6-fluoroestra-1,3,5(10),6,8-pentaen-17-one (6-fluoroequilenin acetate) (Vb)*

A solution of 150 mg. of 6-fluoroequilenin in 2 ml. of pyridiene and 1 ml. of acetic anhydride is allowed to stand at room temperature for 16 hours. The reaction mixture is poured into ice water and the product is filtered and washed with water. Recrystallization from aqueous methanol affords pure 6-fluoroequilenin acetate, melting point 145°–148° C.

*Example 6.—Preparation of 6-fluoroestra-1,3,5(10),6,8-pentaene-3,17β-diol(6-fluoro-17β-dihydroequilenin) (VIa)*

A suspension of 439 mg. of 6-fluoroequilenin (Va) in 10 ml. of absolute ethanol and 1 ml. of water is treated with 439 mg. of sodium borohydride. The reaction mixture is swirled at room temperature for 30 minutes and then neutralized with 1 N sulfuric acid. Water is added and the product is filtered and washed with water. Recrystallization from aqueous methanol affords pure 6-fluoro-17β-dihydroequilenin, melting point 226°–230° C.

*Example 7.—Preparation of 6-fluoroestra-1,3,5(10)6,8-pentaene 3,17β-diol-diacetate (6-fluoro-17β-dihydroequilenin diacetate) (VIb)*

A solution of 125 mg. of 6-fluoro-17β-dihydro-equilenin in 2 ml. of pyridine and 1 ml. of acetic anhydride is allowed to stand at room temperature for 18.5 hours. The reaction mixture is poured into water and the product is filtered and washed with water. Recrystallization from aqueous methanol affords pure 6-fluoro-17β-dihydroeqilenin diacetate, melting point 113.5°–115° C.

We claim:
1. A compound of the formula:

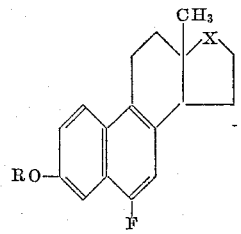

wherein R is selected from the group consisting of hydrogen and lower alkanoyl and X is selected from the group consisting of

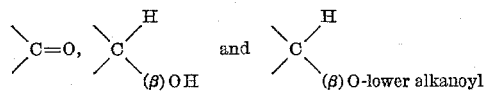

2. The compound 6-fluoro-3-hydroxyestra-1,3,5(10),6,8-pentaen-17-one.
3. The compound 3-acetoxy-6-fluoroestra-1,3,5(10),6,8-pentaen-17-one.
4. The compound 6-fluoroestra-1,3,5-(10),6,8-pentaene-3,17β-diol.
5. The compound 6-fluoroestra-1,3,5(10),6,8-pentaene-3,17β-diol-diaceate.
6. The compound 9α-bromo-6α-fluoro-11β-hydroxyandrosta-1,4,-diene-3,17-dione.
7. The compound 6α-fluoro-11β-hydroxyandrosta-1,4,8-triene-3,17-dione.
8. The compound 6α-fluoroandrosta-1,4,8(14),9(11)-tetraene-3,17-dione.
9. A method of preparing 6-fluoro-3-hydroxy-estra-1,3,5(10),6,8-pentaen-17-one which comprises heating 6α-fluoro-11β-hydroxyandrosta-1,4,8-triene-3,17-dione in acidic solvent and recovering said compound therefrom.
10. A method of preparing a 6-fluoroestra-1,3,5(10),6,8-pentaene-3,17β-diol which comprises heating 6α-fluoro-11β-hydroxyandrosta-1,4,8-triene-3,17-dione in an acidic solvent, subsequently treating the reaction product with sodium borohydride and recovering said compound therefrom.

References Cited by the Examiner
UNITED STATES PATENTS
3,082,225   3/1963   Reimann _____ 260—397.45

LEWIS GOTTS, *Primary Examiner.*

HENRY A. FRENCH, *Assistant Examiner.*